US006321430B1

(12) United States Patent
Goldman et al.

(10) Patent No.: US 6,321,430 B1

(45) Date of Patent: Nov. 27, 2001

(54) WORKPIECE CARRYING SYSTEM

(75) Inventors: Mark E. Goldman, San Rafael, CA (US); Michael A. Mueller, Phoenix, AZ (US)

(73) Assignee: Axxess Technologies, Inc., Tempe, AZ (US)

(*) Notice: Subject to any disclaimer, the term of this patent is extended or adjusted under 35 U.S.C. 154(b) by 0 days.

(21) Appl. No.: 09/205,694

(22) Filed: Dec. 4, 1998

(51) Int. Cl.[7] .............................. B23Q 3/06; B23C 9/00; B41F 17/36; B65G 47/24

(52) U.S. Cl. .................... 29/33 P; 198/345; 198/867.05; 206/328; 221/119; 269/287; 409/219

(58) Field of Search .................................... 29/33 P, 563, 29/564; 409/219, 225; 269/287; 221/312 R, 119; 408/103; 198/867.05, 803.8, 803.14, 803.15; 206/386, 326, 328

(56) References Cited

U.S. PATENT DOCUMENTS 3,090,478 * 5/1963 Stanley ........................... 29/33 PUX
3,417,865 * 12/1968 Suverkropp et al. .................. 206/46
3,892,312 * 7/1975 Tems .................................... 206/328
3,954,175 * 5/1976 Mason .................................. 206/328
3,964,619 * 6/1976 Irmler ............................... 221/119 X
4,007,479 * 2/1977 Kowalski ......................... 206/328 Y
4,069,496 * 1/1978 Kowalski .............................. 206/328
4,189,996 * 2/1980 Ackley, Sr. et al. ............ 198/803.14
4,346,817 * 8/1982 Kareher ............................ 221/312 R
4,664,570 5/1987 Tsukiji et al. .
4,681,221 * 7/1987 Chickanosky et al. .............. 206/328
4,736,830 * 4/1988 Hofmann ............................. 198/345
4,881,639 * 11/1989 Matsuoka et al. ................... 206/328
4,993,895 * 2/1991 Nordstrom ........................... 408/103
5,346,341 9/1994 Jambor .
5,429,461 7/1995 Mukherjee et al. .
5,484,052 * 1/1996 Pawloski ......................... 198/867.05
5,569,003 10/1996 Goldman et al. .
5,810,526 9/1998 Hirai .
6,012,569 * 1/2000 Sorrentino ........................ 29/33 P X

FOREIGN PATENT DOCUMENTS

1303260 * 1/1973 (GB) ............................... 198/803.15
46987 * 2/1989 (JP) ...................................... 269/287

* cited by examiner

*Primary Examiner*—William Briggs
(74) *Attorney, Agent, or Firm*—Finnegan, Henderson, Farabow, Garrett & Dunner, L.L.P.

(57) ABSTRACT

A system for holding or transporting engraveable workpieces of different configurations is provided. The system includes a first workpiece carrier that has an internal relief configured to receive a first workpiece having a first configuration. The system also includes a second workpiece carrier that has an internal relief configured to receive a second workpiece having a second configuration. The outer surface of the second workpiece carrier is substantially the same as the outer shape of the first workpiece carrier, to thereby provide a carrier of uniform outer dimensions regardless of the workpiece configuration. The carrier may hold the workpiece within the internal relief through a snap lock and in such a manner as to avoid contact with and possible damage from an adjacently stored workpiece.

11 Claims, 7 Drawing Sheets

WORKPIECE CARRYING SYSTEM

BACKGROUND OF THE INVENTION

The present invention relates generally to the field of engraving. More particularly, the invention relates to a method and system for holding and transporting engraveable workpieces of different configurations.

There is a great consumer demand for personally engraved items of many different shapes and sizes. To meet this demand, many stores offer a variety of engraveable items to consumers. These stores maintain engraving machines on the premises so that the engraveable items may be engraved with a message or design chosen by the consumer.

There are two basic types of engraving machines, manual and automated. Typically, a manual engraving machine must be operated by a skilled engraver. One of the necessary skills is the ability to properly position a workpiece in the engraving machine. If the workpiece is not positioned properly in the machine, the engraving process will result in a ruined workpiece. Maintaining a skilled engraver on site can be an expensive proposition for many small stores.

Automated engraving machines are viable alternatives to the manual engraving machines. An automated engraving machine is designed to perform many of the detailed portions of the engraving operation and, thus, avoid the need to have a skilled engraver complete the engraving. However, a problem with the known automated engraving machines is the cost associated with the need to handle workpieces of different configurations. To handle differently shaped workpieces, the known automated machines, like the machine disclosed in U.S. Pat. No. 5,569,003, utilize a design that includes a series of storage columns that store blank workpieces and a series of corresponding shuttles that transport the workpieces from the storage area to the engraving area. The shuttles also hold the workpiece in place during the engraving operation. Because the orientation of the workpiece is critical to producing a properly engraved item, each storage column and shuttle must be uniquely configured to handle a particular size and shape of workpiece. Thus, to engrave a workpiece having a new shape, many parts of the automated engraving machine must be exchanged to accommodate the new shape.

Another problem with the known automated engraving machines is the manner in which workpieces are stored. In the typical automated engraving machine, blank workpieces are stacked one on top of another in storage columns. When workpieces are loaded into the storage columns or when workpieces are removed from the storage columns for engraving, the workpieces tend to slide against each other. The resulting contact of workpiece on workpiece may result in scratches or other damage on one or both of the workpieces. This damage, which occurs prior to the engraving process, results in a poor quality product.

In light of the foregoing, there is a need for a workpiece carrying system that will eliminate the need to account for each individually shaped workpiece and that will protect the workpieces.

SUMMARY OF THE INVENTION

Accordingly, the present invention is directed to a system and method for holding and transporting engraveable workpieces of different configurations. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to a system for holding workpieces of different configurations. The system includes a first engraveable workpiece that has a first configuration and a second engraveable workpiece that has a second configuration that is different from the first configuration. There is provided a first workpiece carrier that has an internal relief configured to receive and hold the first engraveable workpiece. There is also provided a second workpiece carrier that has an internal relief configured to receive and hold the second engraveable workpiece. The outer shape of the second workpiece carrier has substantially the same shape as the outer shape of the first workpiece carrier.

In another aspect, the invention is directed to an engraving system. The engraving system includes a first engraveable workpiece that has a first configuration and a second engraveable workpiece that has a second configuration that is different from the first configuration. There is provided a first workpiece carrier that has an internal relief configured to receive and hold the first workpiece and a second workpiece carrier that has an internal relief configured to receive and hold the second workpiece. The outer surface of the second workpiece carrier has substantially the same shape as the outer surface of the first workpiece carrier. There is further provided an engraving machine that includes a workpiece clamping device. The workpiece clamping device is configured to receive either the first workpiece carrier or the second workpiece carrier to position the first or second workpiece held therein for engraving.

In still another aspect, the invention is directed to an engraving system that includes an engraveable workpiece and a workpiece carrier that has an internal relief configured to receive the engraveable workpiece. A snap lock is disposed along the internal relief to hold the engraveable workpiece within the internal relief.

In yet another aspect, the invention is directed to an automated engraving system that includes a storage device for storing a plurality of engraveable workpieces. There is also provided a plurality of workpiece carriers to be stacked within the storage device. Each of the workpiece carriers is configured to carry one of the plurality of engraveable workpieces and provide a buffer from an adjacent workpiece to prevent the workpieces from being damaged in the storage device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference will now be made in detail to the present preferred embodiments of the invention, examples of which are illustrated in the accompanying drawings. Wherever possible, the same reference numbers will be used throughout the drawings to refer to the same or like parts.

In accordance with the present invention, a system for holding or transporting engraveable workpieces of different configurations is provided. The system includes a first workpiece carrier and a second workpiece carrier. The first carrier has an internal relief configured to receive and hold a first workpiece having a first configuration. The second carrier has an internal relief configured to receive and hold a second workpiece having a second configuration that is different from the configuration of the first workpiece. The outer shapes of the first and second workpiece carriers are substantially the same. An exemplary embodiment of a first workpiece carrier according to the present invention is shown in FIG. 1 and is designated generally by reference number 20.

Figure 1:
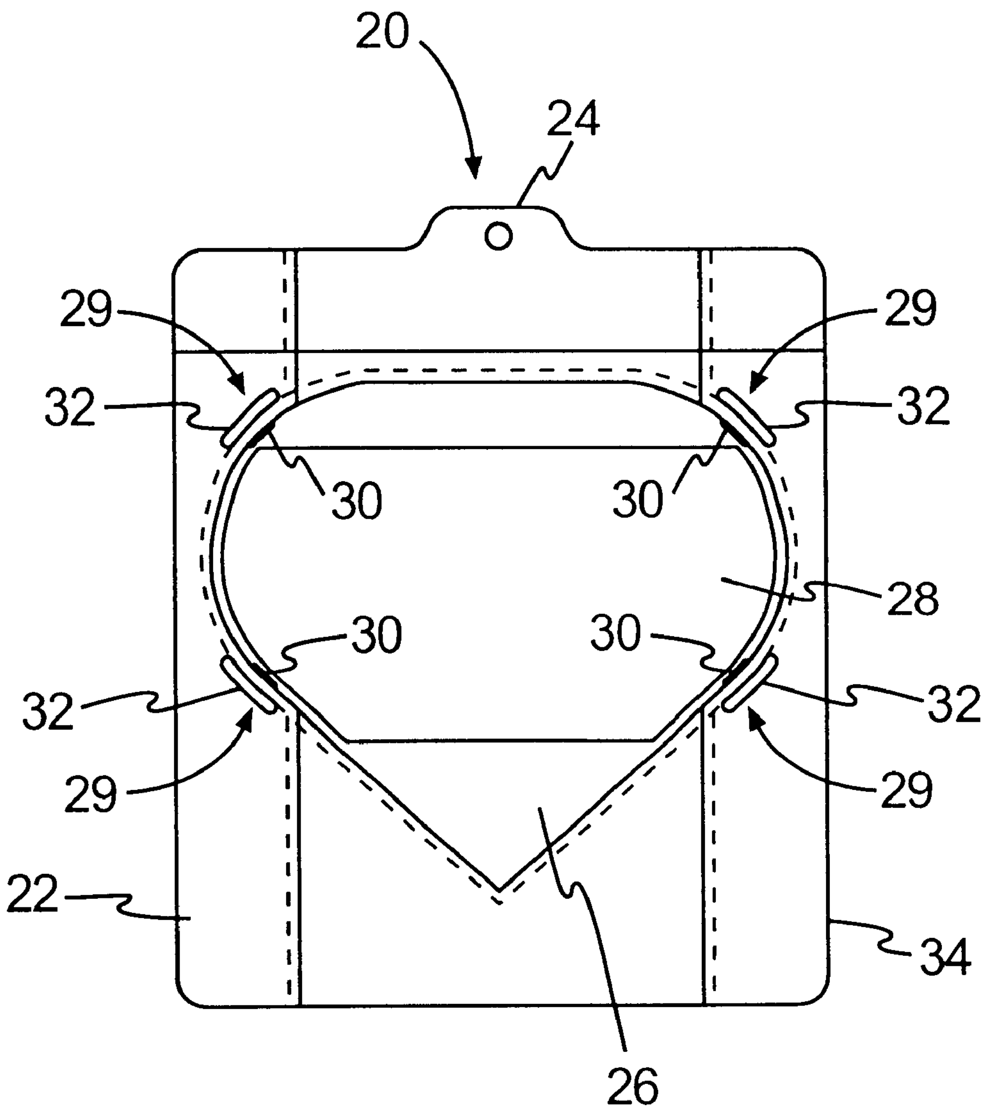
FIG. 1 is a top view of a workpiece carrier in accordance with the present invention.
Figure 2:
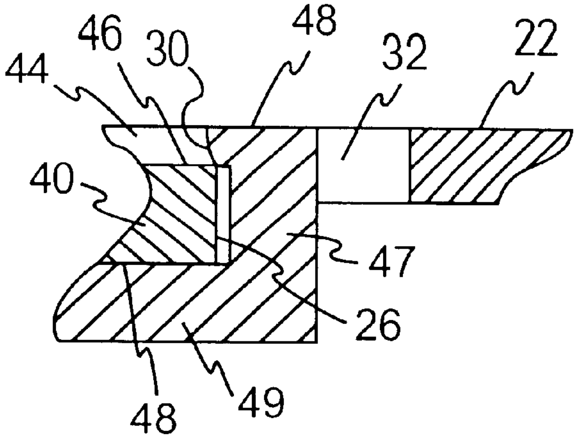
FIG. 2 is a partial side cross-sectional view of the internal relief of the workpiece carrier according to the present invention.

As shown in FIG. 1, carrier 20 includes a main body 22. The main body includes an internal relief 26. Internal relief 26 is configured to receive and hold an engraveable workpiece. As shown in FIG. 2, internal relief 26 is framed within main body 22 by a sidewall 47 and a backwall 49.

In the embodiment illustrated in FIG. 1, internal relief 26 is configured to hold a heart-shaped workpiece. It is, however, contemplated that the internal relief may be configured to receive and hold any configuration of workpiece.

Preferably, as illustrated in FIG. 1, a plurality of snap locks 29 are positioned along internal relief 26 to hold the workpiece within the internal relief. Each snap lock 29 includes a tab 30 and a corresponding opening 32. Snap locks 29 may be positioned uniformly around internal relief 26 or in any other pattern readily apparent to one skilled in the art as capable of holding the workpiece within internal relief 26. Under certain circumstances, it is contemplated that a single snap lock or, alternatively, a continuous snap lock may securely hold the workpiece within the internal relief.

As illustrated in FIG. 2, the depth of internal relief 26 is determined by the thickness of the workpiece to be held therein. When workpiece 40 is positioned in internal relief 26, one side 46 of the workpiece should contact tab 30 and the other side 48 of the workpiece should contact the backwall 49. This configuration will ensure that the workpiece is held firmly within the workpiece carrier and will not shift with respect to the workpiece carrier when the workpiece is transported or engraved.

Figure 3:
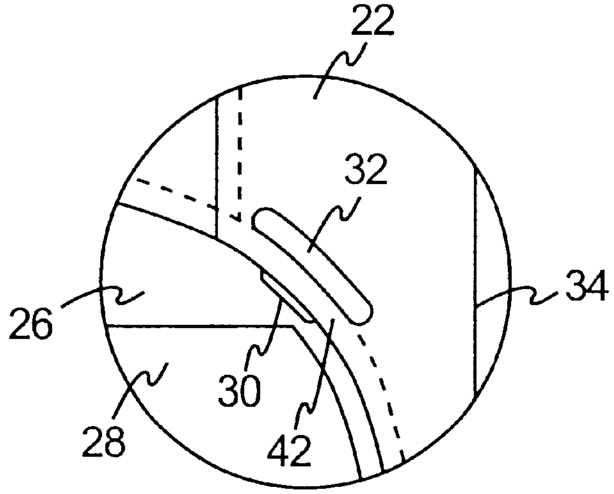
FIG. 3 is a partial top view of a tab and opening positioned along the internal relief of a workpiece carrier.

As shown in FIG. 2, tab 30 projects from main body 22 into internal relief 26. Preferably, tab 30 has a rounded shape. As shown in FIG. 3, one opening 32 is positioned just outwardly of each tab 30. Preferably, the shape of opening 32 generally follows the contours of internal relief 26 and extends past the outer edges of the corresponding tab 30. The opening 32 leaves a relatively small strut 42 of main body 22 between tab 30 and opening 32.

When a workpiece 40 is inserted into internal relief 26, the workpiece will initially contact tab 30. Preferably, main body 22 is made of a lightweight, flexible material, such as plastic, so that the contact of workpiece 40 on tab 30 causes strut 42 to flex outwardly into the area created by opening 32. The movement of strut 42 allows the edge of workpiece 40 to move past tab 30. The rounded shape of tab 30 facilitates this motion. When workpiece 40 is positioned fully within internal relief 26 and the edge of workpiece 40 has moved past tab 30, strut 42 flexes, or snaps, back to its original position, thereby locking workpiece 40 between tab 30 and backwall 49 and firmly holding the workpiece within internal relief 26.

As shown in FIG. 2, tabs 30 also provide a buffer 44 between the surface 46 of workpiece 40 and the top surface 48 of main body 22. This buffer will prevent surface 46 of workpiece 40 from being scratched or otherwise damaged if a number of carriers are stacked upon one another. This is particularly beneficial in automated engraving machines where stacks of blank workpieces are stored in storage columns or other storage devices.

Figure 4:
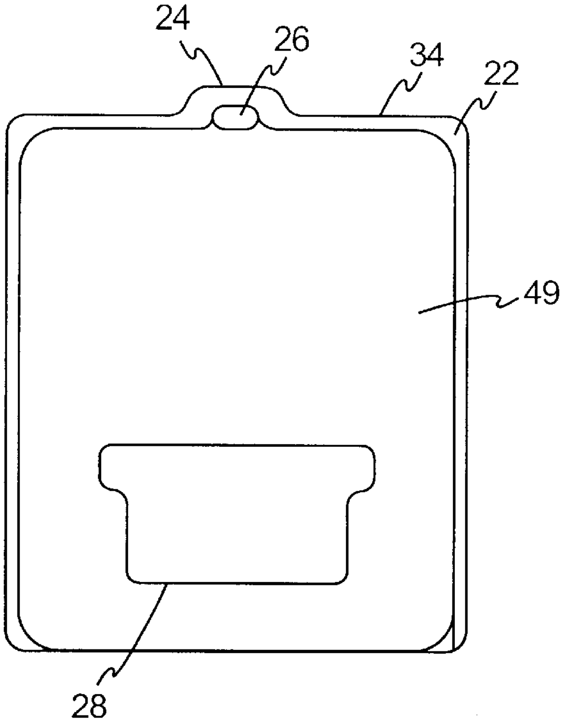
FIG. 4 is a bottom view of an exemplary embodiment of the workpiece carrier of the present invention.
Figure 5:
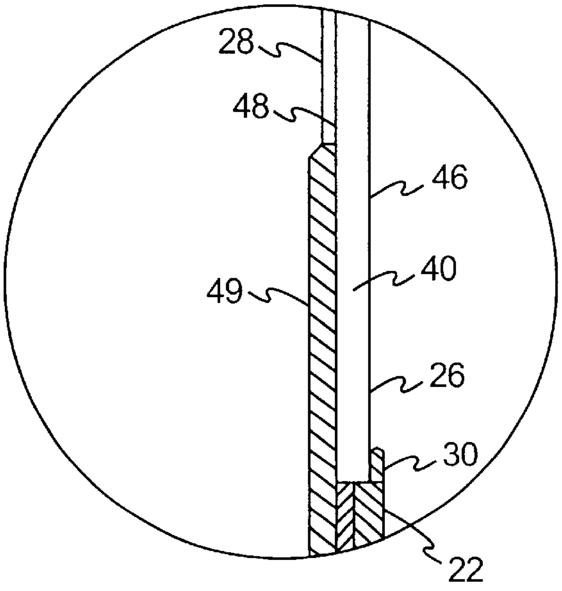
FIG. 5 is a partial side cross sectional view of the workpiece carrier of FIG. 4, illustrating a workpiece being held within the internal relief.
Figure 6A:
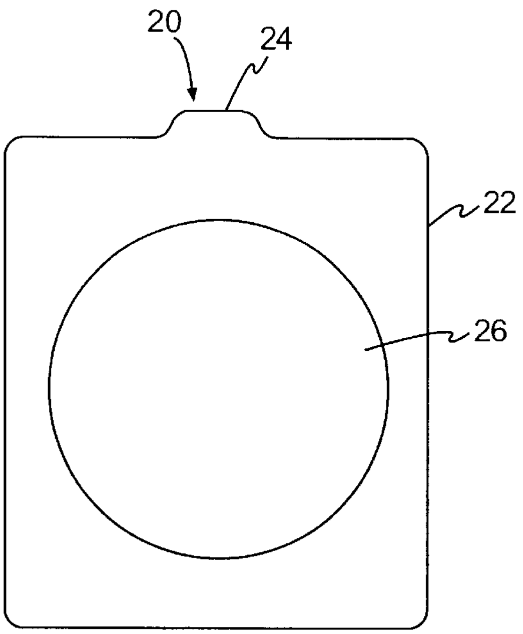
FIGS. 6*a*–6*d* are top views of workpiece carriers having internal reliefs of varying configurations.
Figure 6B:
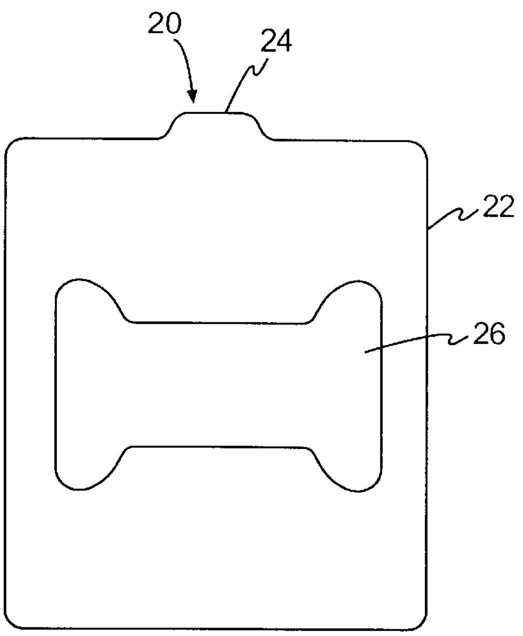
Figure 6C:
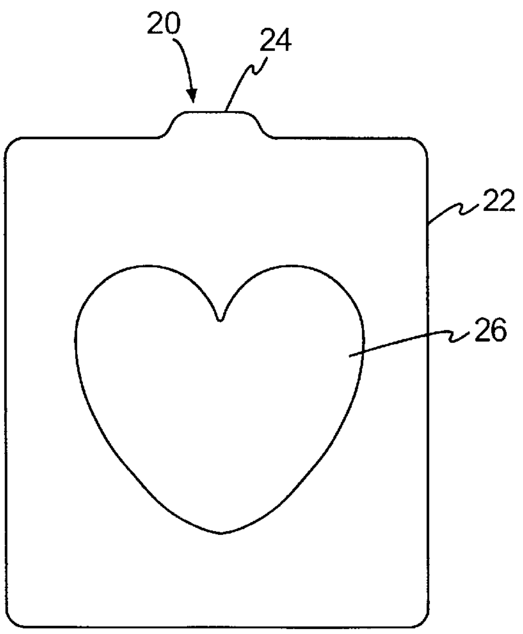
Figure 6D:
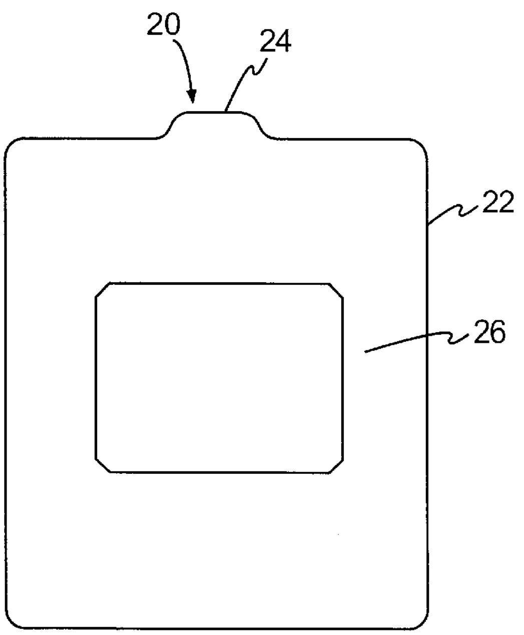

In the exemplary embodiment and as shown in FIGS. 1, 4 and 5, backwall 49 of internal relief 26 includes an opening 28. Opening 28 provides access to the side of workpiece 40 that is placed into internal relief 26 and that contacts backwall 49. This opening allows both sides of the workpiece to be engraved, if desired.

As shown in FIG. 4, backwall 49 preferably covers the majority of one side of the internal relief 26. The size and shape of opening 28 defines the area of the workpiece that is accessible for engraving. The size and shape of opening 28 may be determined based on the configuration of workpiece to be held in the internal relief and the desired amount of engraveable area on the workpiece.

It is contemplated that both sides of the workpiece may be engraved. However, in the case where only one side of the workpiece is to be engraved, the workpiece is preferably inserted into internal relief 26 such that the engraveable side 48 of workpiece 40 is facing opening 28. In this position, backwall 49 covers all of the engraveable side of workpiece 40, with the exception of the engraveable area exposed by opening 28. Thus, backwall 49 protects the majority of the workpiece from scratching or other damage that may occur during the storing, transporting, or engraving of the workpiece.

As illustrated in FIGS. 6*a*–6*d*, internal relief 26 may be configured to receive and hold any configuration of workpiece. Preferably, the internal relief has substantially the same shape as the workpiece to be held therein. However, as shown, the outer surfaces 22 of each carrier have substantially the same shape. The present invention contemplates that the outer shape of each carrier will differ only by a nominal manufacturing tolerance that will be readily apparent to one skilled in the art. In the exemplary embodiments the carriers have a substantially square shape, although it is contemplated that alternative shapes may be used.

The common shape of the workpiece carrier simplifies both the engraving process and the engraving machine used to engrave the workpieces. Because each differently shaped workpiece is held within a carrier that has a common outer shape, the engraving process and machine must only account for the single outer shape of the carrier and not the variety of different shapes of the individual workpieces. Thus, the mechanism used to clamp the workpiece in position for engraving need only handle the shape of the workpiece carrier. With this approach, a user will be required to clamp only the workpiece carrier and not the individual workpieces, which could have a variety of different configurations, within the clamping device. This will lower the complexity or components required to position the workpiece for engraving.

Figure 7:
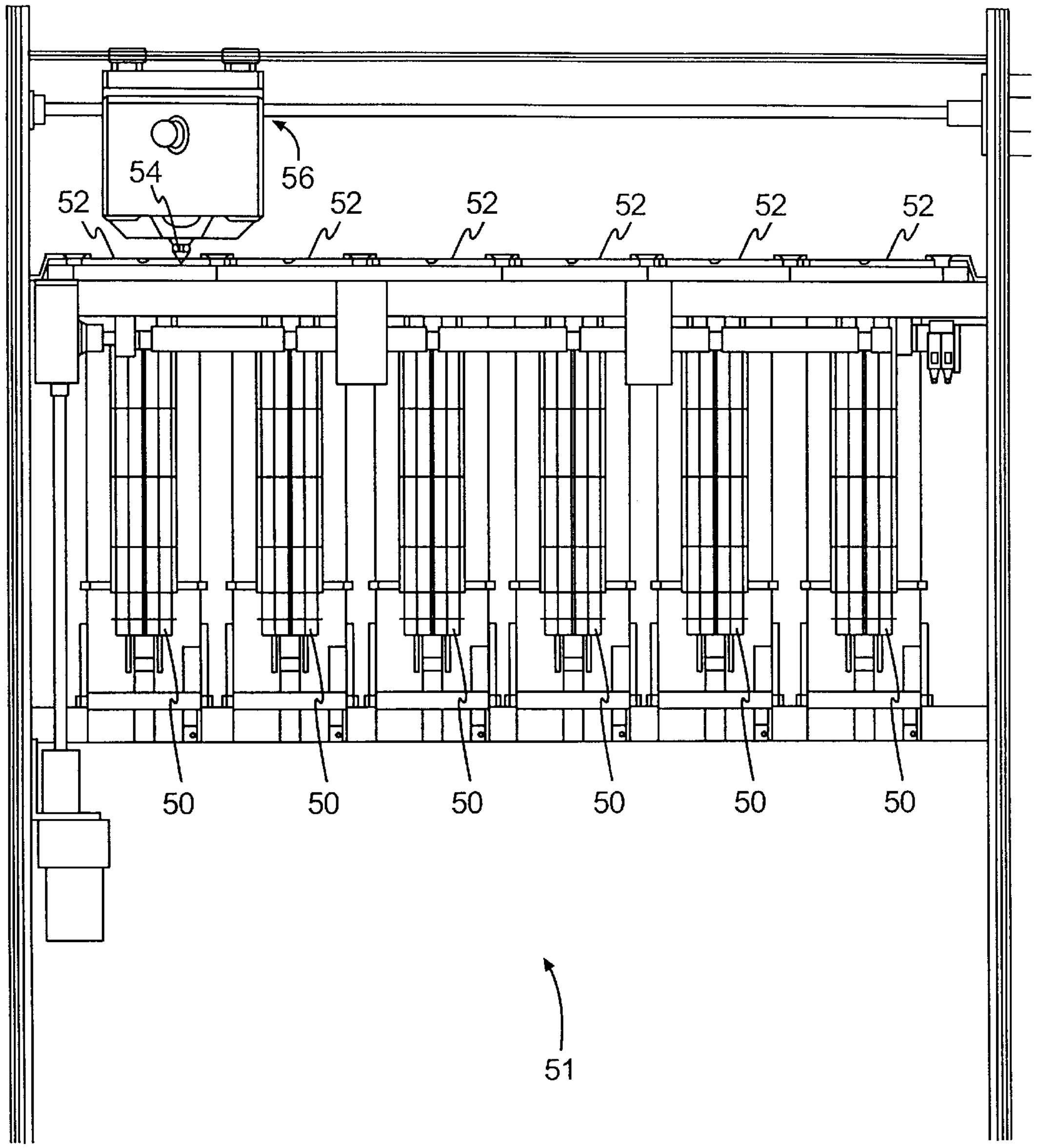
FIG. 7 is a front view of an exemplary automated engraving machine.
Figure 8:
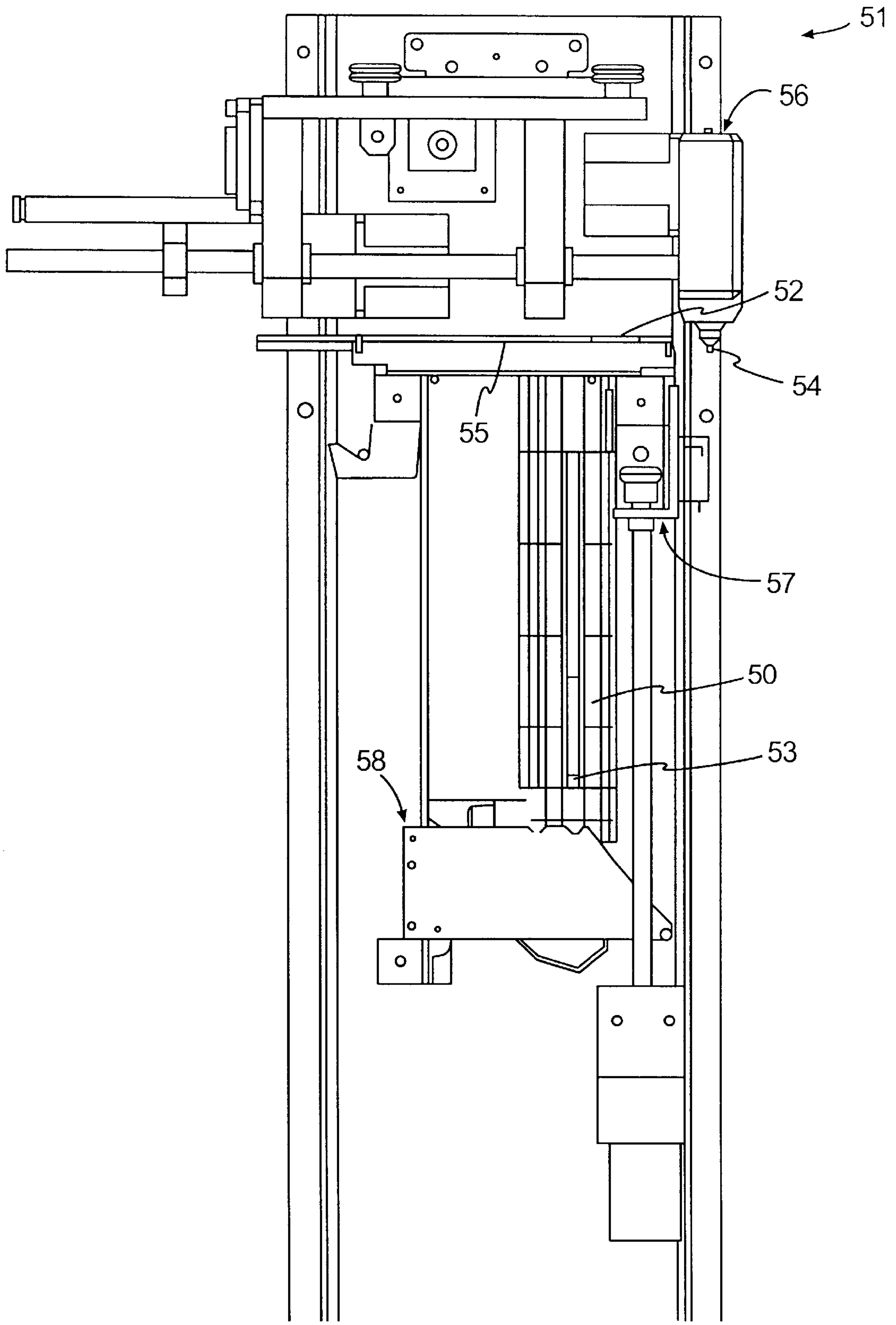
FIG. 8 is a side view of the automated engraving machine of FIG. 7.

In accordance with the present invention, the carriers may be used in conjunction with an automated engraving machine. An exemplary automated engraving machine is illustrated in FIGS. 7 and 8. Exemplary engraving machines are disclosed further in U.S. Pat. No. 5,569,003 to Goldman, and pending U.S. Application Ser. No. 09/046,593 filed on Mar. 24, 1998, both of which are hereby incorporated by reference. It is also contemplated that the present invention may be used with a variety of engraving machines.

The automated engraving machine is designed to perform many of the detailed portions of the engraving operation. The automated engraving machine simplifies the engraving process to a point where an unskilled user may easily engrave any message or design into a blank workpiece. The automated engraving machine usually includes a computer that controls the engraving operation. The engraving operation begins when the user selects a particular configuration of workpiece and a message or design to be engraved on the particular workpiece.

As shown in FIG. 7, a typical automated engraving machine 51 includes several storage devices 50 for storing a supply of differently shaped workpieces. A supply of each shape of workpiece may be stacked within each storage device 50. While the stacking is preferably vertical, it is contemplated that other stacking arrangements could 52 for moving a single workpiece from its respective storage device 50 to the engraving area. The computer operates the transporting devices to move the selected configuration of workpiece from the particular storage device 50 to the engraving area.

As shown in FIG. 8, a spring biasing device 58 corresponds to each storage device 50. Spring biasing device 58 engages a pin 53 that traverses the storage device 50 and supports the stack of workpieces held within the storage column. The pressure of spring biasing device 58 on the stack of workpieces moves a single workpiece into a relief 55 within transporting device 52. Thus, transporting device 52 will move a single workpiece having the selected configuration from storage device 50 to the engraving area.

The engraving machine 51 also includes a clamping device 57 and an engraver 54 mounted on a supporting structure. When transporting device 52 has positioned the workpiece in the engraving area, the computer causes the clamping device 57 to engage the workpiece and clamp the workpiece into place for engraving. The computer then controls the engraver to engrave the selected message or design on the workpiece.

Maintaining the proper alignment of the workpiece during the storing and transporting of the workpiece is important to ensure that each workpiece is properly engraved. If the workpiece were to shift in relation to either the storage device or the transporting device, the workpiece would be clamped in the engraving position out of alignment. This would result in the engraved message or design being similarly out of alignment on the workpiece.

Thus, in conventional automated engraving machines, each storage column 50 and corresponding shuttle 52 are uniquely configured to correspond to one particular shape of workpiece to maintain the correct alignment of the workpieces. For example, if a rectangular workpiece were being engraved, both the storage column and corresponding shuttle would have to have a rectangular shape to ensure the workpiece is aligned properly for engraving. Similarly, if a square-shaped workpiece were being engraved, both the storage column and corresponding shuttle would have to have a square shape to maintain the proper alignment of the workpiece.

However, when the present invention is used in conjunction with an automated engraving machine, such as the one previously described, both the workpiece storing devices and the workpiece transporting devices of the engraving machine can be made generically. That is, the storing and transporting devices need only be configured to store and transport the workpiece carrier and not the individual workpiece. Because the storage device is configured to hold and maintain the alignment of the workpiece carrier, the storage device can therefore store and maintain the alignment of any configuration of workpiece that can be held in the workpiece carrier. Similarly, because the transporting device is configured to transport and maintain the alignment of the workpiece carrier, the transporting device can therefore maintain the alignment of any configuration of workpiece that can be held in the workpiece carrier. Thus, the common shape of the workpiece carrier allows the storage device to be configured independently of the configurations of the individual workpieces.

In addition, the workpiece clamping device of the engraving machine can also be made generically to engage only the common shape of the workpiece carrier to fix the workpiece carrier during the engraving process. As described previously, the carrier securely holds the workpiece within the internal relief. Thus, when the clamping device clamps the workpiece carrier, the individual workpiece is also clamped, regardless of the configuration of the individual workpiece.

Figure 9:
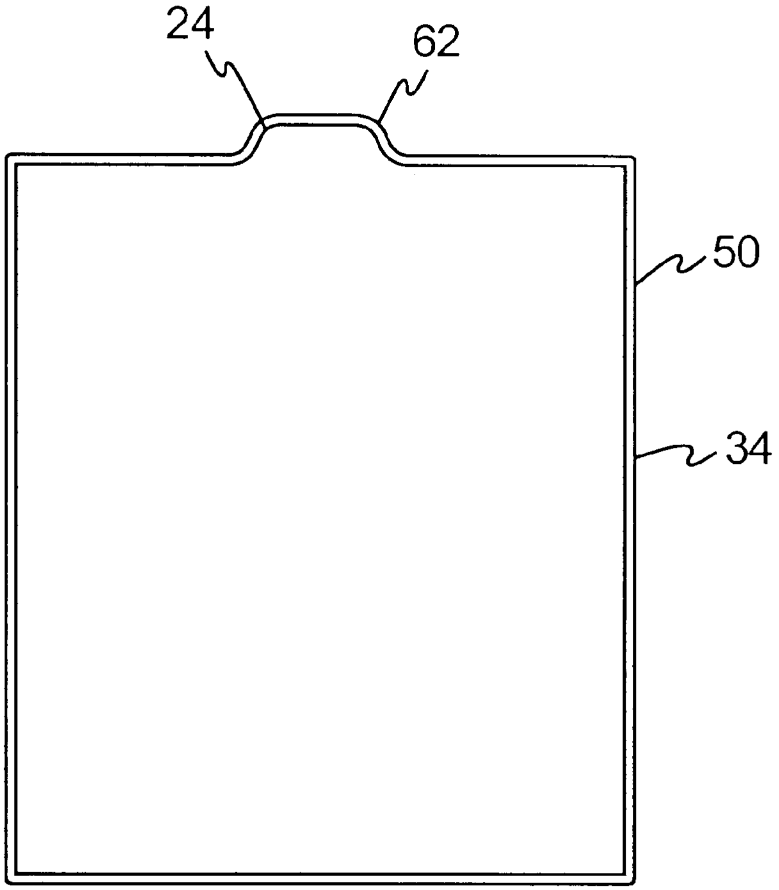
FIG. 9 is a top view of a storage device of the automated engraving machine illustrating the storage of a workpiece carrier of the present invention.

In a preferred embodiment, the main body 22 of carrier 20 includes a surface irregularity 24 along the outer surface 34. As shown in FIG. 9, surface irregularity 24 is configured to engage a corresponding section 62 of storage device 50. The engagement of the surface irregularity with the storage device will ensure workpiece carrier 20, and, thus, the workpiece, is stored in the storage device with the proper orientation and alignment. Thus, the workpiece will be properly aligned in the engraving machine when the workpiece is engraved. Similarly, the transporting and clamping devices of the engraving machine may also include sections corresponding to surface irregularity 24 to ensure proper alignment and orientation of the workpiece.

In the embodiment illustrated in FIG. 9, surface irregularity 24 is positioned off-center along one edge of outer surface 34. The off-center position of irregularity 24 prevents the carrier from being loaded into the engraving machine upside down. If an upside down loading of the carrier was attempted, the surface irregularity would not align with the corresponding section 62 in the storage device 50. Thus, the off-center position ensures that the engraveable side of the workpiece will be properly positioned under the engraver.

It will be apparent to those skilled in the art that various modifications and variations can be made in the method of manufacture of the present invention and in construction of this workpiece securing carrier without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An engraving system, comprising:

a first engraveable workpiece having a first configuration;

a second engraveable workpiece having a second configuration different from the first configuration;

a first workpiece carrier having an internal relief configured to receive and hold the first workpiece;

a second workpiece carrier having an internal relief configured to receive and hold the second workpiece, the outer surface of the second workpiece carrier having substantially the same shape as the outer surface of the first workpiece carrier; and an engraving machine having a workpiece clamping device configured to selectively receive either the first workpiece carrier or the second workpiece carrier to position the first or second workpiece held therein for engraving.

2. The system of claim 1, wherein the engraving machine includes a first and a second storage column configured to store the first and second workpiece carriers, the first and second storage columns being substantially the same dimension in cross section.

3. The system of claim 2, wherein the outer surfaces of the first and second workpiece carriers include a surface irregularity that aligns with a corresponding section of the first and second storage columns to align the first and second workpiece carriers within said columns.

4. The system of claim 3, wherein the surface irregularity of the first and second workpiece carriers aligns with a corresponding section of the workpiece clamping device to align the first and second workpiece carriers within the workpiece clamping device.

5. The system of claim 3, wherein the surface irregularity is positioned off-center along one edge of the outer surfaces of the first and second workpiece carriers.

6. The engraving system of claim 1, further comprising a storage device for storing a plurality of one of the first and second workpiece carriers, said plurality of workpiece carriers being stacked within the storage device, each of said plurality of workpiece carriers configured to provide a buffer between adjacent workpieces to prevent the workpieces from being damaged in the storage device.

7. An inscribing system comprising:

a first workpiece having a first configuration;

a second workpiece having a second configuration different from the first configuration;

a first workpiece carrier having a locking mechanism configured to secure the first workpiece to the first workpiece carrier;

a second workpiece carrier having a locking mechanism configured to secure the second workpiece to the second workpiece carrier, the outer shape of the second workpiece carrier having substantially the same shape as the outer shape of the first workpiece carrier;

an inscriber operable to inscribe the first and second workpieces; and a mechanism configured to securely hold either the first workpiece carrier or the second workpiece carrier to position the first or second workpiece held therein for inscribing.

8. The system of claim 7, wherein each of the first and second workpiece carriers includes an opening to expose at least a portion of both sides of the workpiece held thereon.

9. The system of claim 7, wherein the first workpiece carriers includes a first relief configured to receive the first workpiece and the second workpiece carrier includes a second relief configured to receive the second workpiece carrier.

10. The system of claim 9, wherein the first workpiece carrier includes a series of locking mechanisms disposed around the perimeter of the first relief and the second workpiece carrier includes a series of locking mechanisms disposed around the perimeter of the second relief.

11. The system of claim 7, wherein the inscriber is an engraver.

* * * * *